Sept. 9, 1958 C. L. EDWARDS 2,850,815
VIBRATING CUTTING HEAD FOR EXCAVATING MACHINES
AND METHOD OF ATTACHMENT THERETO
Filed Nov. 25, 1955 2 Sheets-Sheet 1

INVENTOR.
Cameron L. Edwards
BY
ATTORNEY.

Sept. 9, 1958  C. L. EDWARDS  2,850,815
VIBRATING CUTTING HEAD FOR EXCAVATING MACHINES
AND METHOD OF ATTACHMENT THERETO
Filed Nov. 25, 1955  2 Sheets-Sheet 2

INVENTOR.
Cameron L. Edwards
BY
ATTORNEY.

United States Patent Office 2,850,815
Patented Sept. 9, 1958

2,850,815

VIBRATING CUTTING HEAD FOR EXCAVATING MACHINES AND METHOD OF ATTACHMENT THERETO

Cameron L. Edwards, Tulsa, Okla.

Application November 25, 1955, Serial No. 549,110

7 Claims. (Cl. 37—141)

This invention relates to improvements in materials handling equipment and particularly excavated materials such as earth, sand, rock and the like and to equipment for moving, as well as excavating such materials, the primary object being to increase the efficiency thereof through employment of a vibratory unit capable of not only minimizing resistance to a cutting edge as the latter is forced into the material, but adapted also to keep the materials "alive" whereby the same flow freely with respect to the equipment after being loosened and dug away by the cutter bit.

It is the most important object of the present invention to provide a vibratory cutter head for buckets, scoops, shovels, pans, bowls and the like, commonly employed in the excavation and movement of earthy materials and including a cutter bit which, with the remaining portions of the cutter head, form a part of the bottom of the bucket, scoop or the like and thereby not only more effectively cut the materials loose, but cause the same to move steadily and quickly into the confines of the bucket.

Another important object of the instant invention is the proviison of a cutter head of the aforementioned character wherein the vibratory means therefor is contained within, or clamped to, the head itself thereby becoming a part thereof, all to the end that the head is vibrated with respect to the remaining parts of the bucket, particularly by virtue of a novel mounting means for attaching the head to the bucket.

A further object of the instant invention relates to the aforementioned mounting means which includes a series of dampeners disposed at all points of connection or contact between the head and the bucket per se, thereby reducing transmission of the vibratory action to the bucket.

A further object of the instant invention relates to the way in which a thrust element is provided at the forwardmost edge of the rear portion of the bottom of the bucket and against which the vibratory head bears when attached thereto ready for use, together with the way in which the aforementioned dampening means is included between the head and such thrust element.

Other objects include many important details of construction, all to be made clear or become apparent as the following specification progresses, reference being had to the accompanying drawing, wherein.

Figure 1:
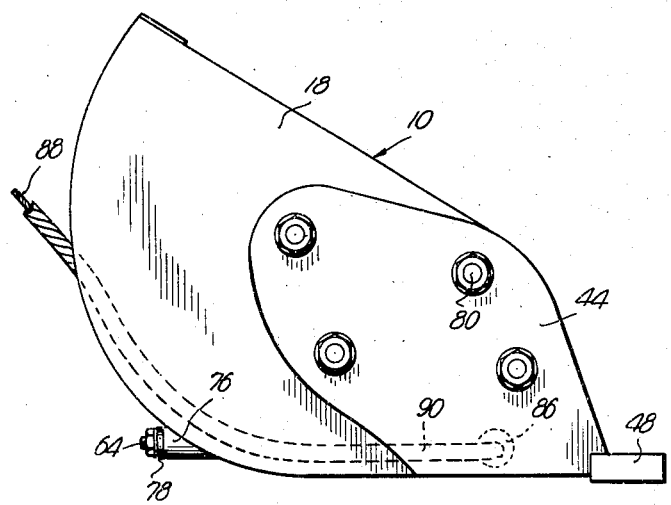
Figure 1 is a side elevational view of a bucket forming a part of a conventional excavating machine and showing a vibrating cutting head made according to the present invention operably mounted thereon.

The materials handling equipment chosen in the drawings for illustrating the principles of the instant invention is in the nature of a conventional bucket, scoop or shovel broadly designated by the numeral 10 and including a preferably arcuate back wall 12 that merges into a plate 14 forming a part of the bottom broadly designated by the numeral 16. Opposed sides 18 and 20 are joined rigidly to the back wall 12 and to the bottom plate 14.

Bottom 16 includes a rear portion 22 and a front portion 24, both spanning the distance between the sides 18 and 20 and both of double-wall construction. To this end, the rear portion 22 includes in addition to the plate 14, a top plate 26 that merges progressively and arcuately with the rear wall 12 to which the same may be permanently attached if desired. A plurality of spaced, vertical reinforcing webs 28 are desirably interposed between the plates 14 and 26 of the rear portion 22 of bottom 16 and connected rigidly thereto.

The front portion 24 of the bottom 16 is in the nature of a vibratory cutting head initially separate from the rear portion 22 and including a bottom plate 30 and a top plate 32 coplanar with the plates 14 and 26 respectively. The top plate 32 is provided with a downwardly and forwardly sloping leading face 34 that joins integrally with the forwardmost end of the plate 30 with which it converges. Spaced-apart plates 30 and 32—34 are preferably joined integrally by a series of spaced, vertical webs 36. Additional vertical webs 38 joined rigidly with horizontal reinforcing plates 40 interconnect the plates 30 and 32 at the rearmost portions of the head 24.

The leading edge of the bucket 10 is defined by an elongated cutter bit 42 coextensive in length with the distance between the sides 18 and 20 and forming a part of the head 24 by virtue of a rigid connection to the plate 30 therebeneath, as well as to opposed side plates 44 and 46 through the medium of ears 48 and 50 at the ends of the bit 42 and secured to plates 44 and 46 respectively.

Figure 3:
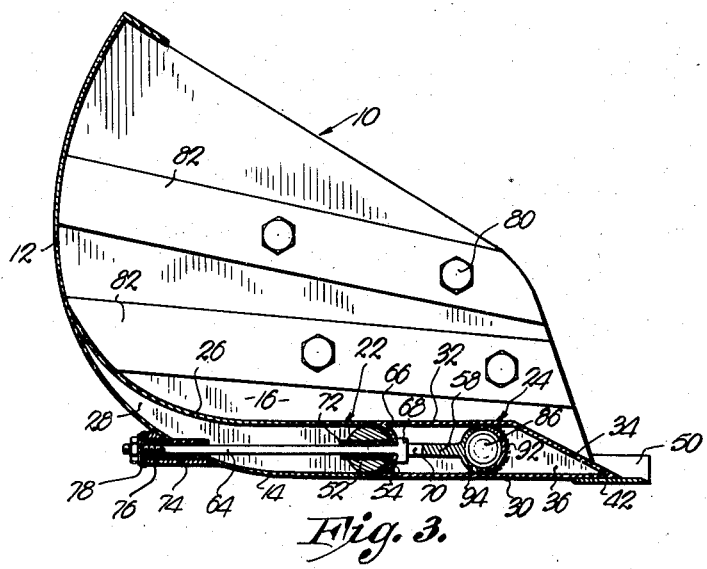
Fig. 3 is a transverse, cross-sectional view taken on line III—III of Fig. 2 looking in the direction of the arrows.

The forwardmost edge of the rear portion 22 of the bottom 16 is defined by an elongated thrust member 52 that is preferably circular in cross-section and secured to the plates 14 and 26 therebetween, as well as to the forwardmost ends of the webs 28 which are provided with semi-circular notches as seen best in Fig. 3 to accommodate the thrust element 52.

A semi-circular saddle 54 coextensive in length with the element 52 complementally fits the thrust element 52 and presents therefore, a socket for receiving the latter. It is to be noted that saddle 54 forms a part of a mount for the cutter head 24 broadly designated by the numeral 56. To this end, therefore, the mounting means 56 includes a horizontal plate 58 rigid to the forwardmost face of the saddle 54 intermediate the ends of the latter.

A pair of the vertical webs 38, as well as the plate 58, are provided with relatively overlapping ears broadly designated by the numeral 60 and which are releasably interconnected by suitable fasteners such as bolts and nuts 62 which serve, therefore, to attach the head 24 to the mounting means 56.

Figure 2:
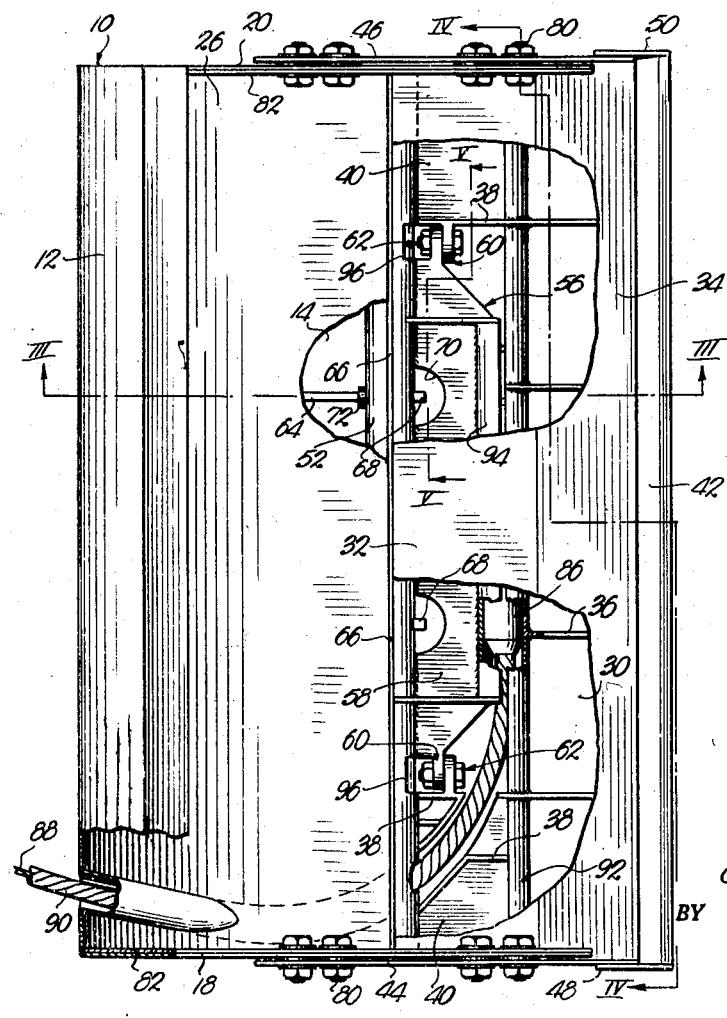
Fig. 2 is a top plan view thereof parts being broken away and in section to reveal details of construction.
Figure 5:
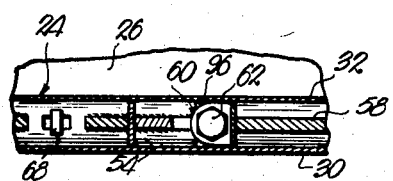
Fig. 5 is a fragmentary, detailed, cross-sectional view taken on irregular line V—V of Fig. 2.

The mount 56 and saddle 54 rigid thereto are releasably attached to the rear portion 22 of the bottom 16 through the medium of a plurality of take-up bolts 64 passing through saddle 54, thrust element 52 and rear wall 12 adjacent plate 14, as well as through a resilient damper 66 formed from rubber or the like and lining the inner face of saddle 54 between the latter and the thrust element 52. It is noted that the dampening means 66 extends upwardly and downwardly between the plates 26 and 32 as well as between the plates 14 and 30. The bolts 64 are provided with special heads 68 (Figs. 2, 3 and 5)

that complementally seat against the arcuate outer or forward face of the saddle 54 and which heads 68 are cleared by recesses 70 within the plate 58. The rearmost edges of plates 40 are separate from saddle 54 but bear against the front face of the latter as seen in Fig. 2.

Bolts 64 are cushioned or dampened by use of resilient sleeves 72 within the thrust element 52 and by similar sleeves 74 contained within tubes 76 extending rearwardly from the point of merger between back wall 12 and bottom plate 14. Limited fore-and-aft movement of the bolts 64 on their longitudinal axes is permitted not only by virtue of the dampening liner 66 but by resilient washers 78 bearing against the outermost ends of the tubes 76.

Figure 4:
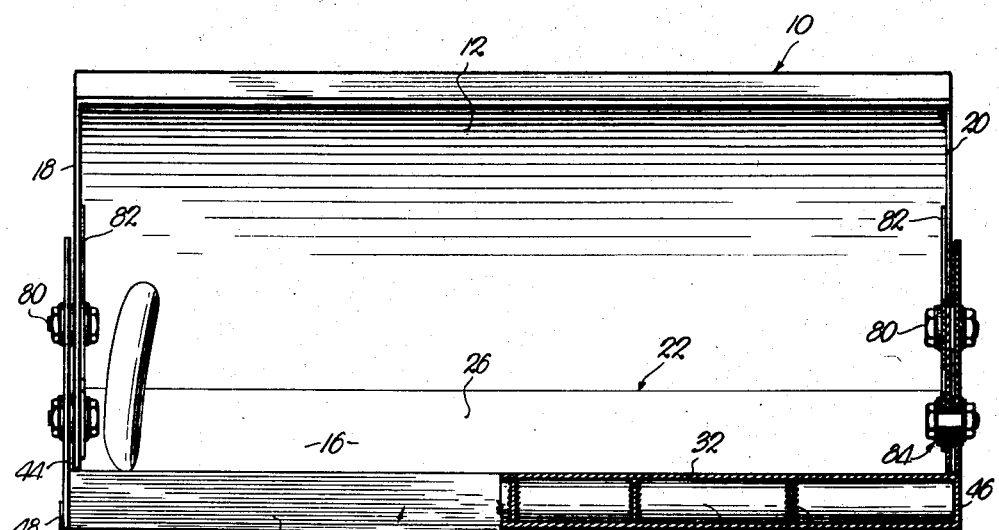
Fig. 4 is a cross-sectional view taken on irregular line IV—IV of Fig. 2, looking in the direction of the arrows.

Notable still further in Fig. 4 of the drawings is the fact that bolts 80 that join side plates 44 and 46 with sides 18 and 20 respectively and which pass through reinforcing strips 82 on the sides 18 and 20, are dampened by use of resilient structure broadly designated by the numeral 84.

It is contemplated that a conventional vibrator 86 be employed to impart movement to head 24 and having contained therein a rotatable eccentrically disposed counterweight (not shown) and driven by a flexible shaft 88 contained within a cable 90 that passes from the vibrator 86 between plates 30 and 32, through saddle 54, liner 66 and thrust element 52, thence between the plates 14 and 26, and finally through the rear wall 12 as best seen in Fig. 2.

Vibrator 86 is carried solely by the head 24 and its mounting means 56, and to this end a semi-circular saddle 92 is mounted between the plates 30 and 32 and secured to the webs 36 at the rearmost ends of the latter. The saddle 92 cooperates with a complemental forwardly-facing, semi-circular saddle 94 secured to the forwardmost edge of the plate 58 between plates 30 and 32 but separate therefrom. Consequently, it is seen that when the bolts 62 are taken up, the vibrator 86 is clamped in place between the saddles 92 and 94.

It is seen that mount 56 may be quickly and easily removed from the bucket 10 by removal of bolts 64 and 80, whereupon the head 24 may be in turn released from the mounting means 56 by removal of bolts 62 which are in turn accessible through openings 96 in the saddle 54 which releases the vibrator 86.

In operation, actuation of the vibrator 86 imparts vibratory movement to the head 24, as well as to the cutter bit 42, therefore, as the bucket 10 is advanced into and through the materials to be handled thereby, resistance to cutting action by the bit 42 is diminished and as soon as the loosened material falls upon the inclined ramp 34 and upon the plate 32, such material will be kept "alive" and be more easily moved into the confines of the bucket 10 between the sides 18 and 20 thereof and upon the rear portion 22 of bottom 16.

The vibratory action that is imparted to the head 24, as well as to the bit 42, is adequately dampened and such movement is therefore, not imparted to the remaining parts of the bucket 10 which includes the rear portion 22 of bottom 16, the sides 18 and 20, and the back 12 thereof. The thrust element 52 adequately absorbs the forces that are imparted to the head 24 and the bit 42 as the same are forced into the materials to be handled, all without in any way impeding the vibratory action of head 24 and its associated parts with respect to the remaining elements of the earth handling equipment.

Having thus described the invention what is claimed as new and desired to be secured by Letters Patent is:

1. In materials handling equipment, a bucket having a bottom including a front portion and a rear portion, said front portion being initially separate from the rear portion and in the nature of a vibratable cutter; a thrust member defining the leading edge of said rear portion; a saddle defining the rearmost edge of said front portion; resilient dampening means interposed between the member and the saddle; an elongated cutter bit rigid to said front portion and defining the leading edge thereof; releasable means interconnecting said portions and including structure clamping the saddle, the dampening means and the member together as a unit; and power means mounted on and carried by said front portion for vibrating the latter.

2. In materials handling equipment, a bucket having a bottom including a front portion and a rear portion, said front portion being initially separate from the rear portion and in the nature of a vibratable cutter; a thrust member defining the leading edge of said rear portion; a saddle defining the rearmost edge of said front portion, said member comprising an elongated, circular rod, said saddle being transversely arcuate complementally with the member; resilient dampening means lining the saddle between the latter and the member; an elongated cutter bit rigid to said front portion and defining the leading edge thereof; releasable means interconnecting said portions and including structure clamping the saddle, the dampening means and the member together as a unit; and power means mounted on and carried by said front portion for vibrating the latter.

3. In materials handling equipment, a bucket having a bottom including a front portion and a rear portion, said front portion being initially separate from the rear portion and in the nature of a vibratable cutter; a thrust member defining the leading edge of said rear portion; a saddle defining the rearmost edge of said front portion, said member comprising an elongated, circular rod, said saddle being transversely arcuate complementally with the member; resilient dampening means lining the saddle between the latter and the member; an elongated cutter bit rigid to said front portion and defining the leading edge thereof; releasable means interconnecting said portions and including structure clamping the saddle, the dampening means and the member together as a unit; a number of resilient sleeves traversing the member, said structure including bolt means within the sleeves and traversing the saddle and the dampening means; and power means mounted on and carried by said front portion for vibrating the latter.

4. In materials and handling equipment, a bucket having a back and a bottom, said bottom including a front portion and a rear portion, said front portion being initially separate from the rear portion and in the nature of a vibratable cutter; a thrust member defining the leading edge of said rear portion; a saddle defining the rearmost edge of said front portion, said member comprising an elongated, circular rod, said saddle being transversely arcuate complementally with the member; resilient dampening means lining the saddle between the latter and the member; an elongated cutter bit rigid to said front portion and defining the leading edge thereof; releasable means interconnecting said portions and including structure clamping the saddle, the dampening means and the member together as a unit; a number of resilient sleeves traversing the member, said structure including bolt means within the sleeves and traversing the saddle and the dampening means, said bolt means being yieldably attached to the bucket adjacent said back and said rear portion; and power means mounted on and carried by said front portion for vibrating the latter.

5. In materials handling equipment, a bucket having a back, a bottom and a pair of sides, said bottom including a front portion and a rear portion, said front portion being initially separate from the rear portion and in the nature of a vibratable cutter; a thrust member defining the leading edge of said rear portion; a saddle defining the rearmost edge of said front portion, said member comprising an elongated, circular rod, said saddle being transversely arcuate complementally with the member; resilient dampening means lining the saddle between the latter and the member; an elongated cutter bit rigid to said front portion and defining the leading edge thereof; releasable means interconnecting said portions and including structure clamping the saddle, the dampening means and the member together as a unit; a number of resilient sleeves traversing the member, said structure including bolt means within the sleeves and traversing the saddle and the dampening means, said bolt means being yieldably attached to the bucket adjacent said back and said rear portion, said releasable means including a pair of plates rigid to said front portion, and yieldable means attaching each plate to a corresponding one of said sides; and power means mounted on and carried by said front portion for vibrating the latter.

6. In materials handling equipment, a bucket having a bottom including a front portion and a rear portion, said front portion being initially separate from the rear portion and in the nature of a vibratable cutter; a thrust member defining the leading edge of said rear portion; a saddle defining the rearmost edge of said front portion and bearing against the member; an elongated cutter bit rigid to said front portion and defining the leading edge thereof; releasable means interconnecting said portions, and including a pair of plates rigid to said front portion, and yieldable means attaching each plate to a corresponding one of said sides; and power means mounted on and carried by said front portion for vibrating the latter.

7. In materials handling equipment, a bucket having a bottom including a front portion and a rear portion, said front portion being initially separate from the rear portion and in the nature of a vibratable cutting head; a thrust member defining the leading edge of said rear portion; an elongated cutter bit rigid to said front portion and defining the leading edge thereof; a saddle between said portions bearing against the member; releasable means interconnecting the saddle and the member; a mount between the front portion and the saddle and rigid to the latter; a vibratory device between the mount and the front portion; and releasable means attaching the front portion to the mount and clamping said device therebetween.

References Cited in the file of this patent

UNITED STATES PATENTS

| | | |
|---|---|---|
| 1,578,724 | Gregg | Mar. 30, 1926 |
| 1,695,480 | Bouy | Dec. 18, 1928 |
| 2,228,445 | DeVelbiss | Jan. 14, 1941 |
| 2,443,492 | Austin | June 15, 1948 |
| 2,641,173 | Rhoten | June 9, 1953 |
| 2,725,799 | Day | Dec. 6, 1955 |

FOREIGN PATENTS

| | | |
|---|---|---|
| 401,265 | Italy | Jan. 14, 1943 |